(12) United States Patent
Cox et al.

(10) Patent No.: US 10,792,700 B2
(45) Date of Patent: Oct. 6, 2020

(54) INCORPORATION OF ADDITIVES INTO PROTECTIVE COATINGS

(71) Applicant: HZO, Inc., Draper, UT (US)

(72) Inventors: Bronwyn Cox, Spanish Fork, UT (US); Sean Owen Clancy, Draper, UT (US); Yang Yun, Draper, UT (US); Tining Su, Draper, UT (US); Liulei Cao, Salt Lake City, UT (US)

( * ) Notice: Subject to any disclaimer, the term of this patent is extended or adjusted under 35 U.S.C. 154(b) by 699 days.

(21) Appl. No.: 14/834,325

(22) Filed: Aug. 24, 2015

(65) Prior Publication Data
US 2016/0052015 A1 Feb. 25, 2016

Related U.S. Application Data

(60) Provisional application No. 62/040,976, filed on Aug. 22, 2014.

(51) Int. Cl.
| | |
|---|---|
| *B05D 1/00* | (2006.01) |
| *C09D 165/04* | (2006.01) |
| *C08K 5/00* | (2006.01) |
| *B05D 5/06* | (2006.01) |
| *B05D 1/34* | (2006.01) |

(52) U.S. Cl.
CPC ............... *B05D 1/60* (2013.01); *C08K 5/005* (2013.01); *C08K 5/0008* (2013.01); *C08K 5/0041* (2013.01); *C09D 165/04* (2013.01); *B05D 1/34* (2013.01); *B05D 5/06* (2013.01); *C08G 2261/3424* (2013.01); *C08G 2261/59* (2013.01); *C08G 2261/592* (2013.01)

(58) Field of Classification Search
CPC ................................. C09D 147/00; B05D 1/60
See application file for complete search history.

(56) References Cited

U.S. PATENT DOCUMENTS

| 5,139,813 A | * | 8/1992 | Yira | ........................ B05D 1/62 250/484.2 |
|---|---|---|---|---|
| 2005/0218381 A1 | * | 10/2005 | Maruyama | ......... C08G 73/0266 252/500 |
| 2006/0029271 A1 | * | 2/2006 | Miyoshi | .................... G06T 3/00 382/154 |
| 2011/0008539 A1 | * | 1/2011 | Negishi | .................... B05D 1/60 427/248.1 |
| 2013/0177699 A1 | * | 7/2013 | Stevens | .................... B05D 1/60 427/8 |

FOREIGN PATENT DOCUMENTS

WO WO99/55471 * 11/1999

* cited by examiner

*Primary Examiner* — Joseph A Miller, Jr.
(74) *Attorney, Agent, or Firm* — Intellectual Strategies

(57) ABSTRACT

Protective coatings with one or more additives dispersed therethrough are disclosed. A protective coating may comprise a poly(p-xylylene), or parylene. An additive may be configured to cause the protective coating to contrast (e.g., visibly, etc.) with features or components that are exposed beyond a periphery of the protective coating. Additives that provide other characteristics are also disclosed. In addition, methods for applying protective coatings according to this disclosure are disclosed, as are inspection methods.

10 Claims, 1 Drawing Sheet

INCORPORATION OF ADDITIVES INTO PROTECTIVE COATINGS

CROSS-REFERENCE TO RELATED APPLICATION

A claim for the benefit of priority to the Aug. 22, 2014, filing date of U.S. Provisional Patent Application 62/040,976, titled INCORPORATION OF ADDITIVES INTO PROTECTIVE COATINGS ("the '976 Provisional Application") is hereby made pursuant to 35 U.S.C. § 119(e). The entire disclosure of the '976 Provisional Application is hereby incorporated by reference.

TECHNICAL FIELD

This disclosure relates generally to protective coatings and, more specifically, to protective coatings that comprise polymer films with little or no permeability to moisture. Even more specifically, this disclosure relates to protective films with additives, such as colorants, protectants against various types of electromagnetic radiation ultraviolet (UV) light and the like, and to methods for incorporating additives into protective coatings during deposition processes.

SUMMARY

The incorporation of additives into protective coatings, or protective films, is disclosed. The protective coatings into which one or more additives are incorporated may include, without limitation, polymer films with little or no permeability to moisture. Such a polymer film may comprise a coating formed from a precursor material such as unsubstituted or substituted [2.2]paracyclophane (i.e., a parylene precursor), which may be processed to form unsubstituted or substituted poly(p-xylylene), or parylene.

In one aspect, an additive that may be incorporated into a protective coating may render the protective coating visibly discernable from the substrate to which the protective coating has been applied, or from one or more components or features of the substrate to which the protective coating has been applied. Such an additive may cause a protective coating to contrast visually with the substrate or components or features of the substrate. Accordingly, an additive that imparts a protective coating with visible discernibility from a substrate or enhances the visible discernibility of the protective coating from the substrate may be referred to herein as a "contrasting additive."

A contrasting additive may comprise a colorant that imparts a protective film with a color that differs from the color of one or more components or features exposed laterally beyond a periphery of the protective film. A fluorescent material may, in some embodiments, be used as a contrasting additive to a protective film. Phosphorescent materials may also be useful as contrasting additives to protective films.

In another aspect, an additive to a protective coating may enhance a property or characteristic of the protective coating. Such an additive may be referred to as an "enhancing additive." Without limitation, an enhancing additive may be incorporated into a protective coating to enhance an ability of the protective coating to withstand exposure to ultraviolet (UV) radiation, which may increase the longevity of the protective coating. Of course, enhancing additives that alter other properties or characteristics of a protective coating (e.g., its ability to transmit heat, its dielectric properties, its water repellence characteristics or its hardness) may also be incorporated into a protective coating.

In some embodiments, a plurality of different types of additives may be incorporated into a protective coating.

An additive (or a plurality of additives) may be incorporated into a protective coating in any of a variety of different ways. In some embodiments, the additive(s) may be introduced into a material processing system (e.g., a chemical vapor deposition (CVD) system or an atomic layer deposition (ALD) system) with a precursor material. Such co-introduction of a precursor material and an additive (or a plurality of addtives) may be achieved by mixing the additive into the precursor material or by separately introducing the precursor material and the additive(s) into the material processing system at the same time.

In other embodiments, an additive (or a plurality of additives) may be introduced into a material processing system while processing the precursor material or while processing one or more products of the precursor material. In embodiments where the precursor material comprises a parylene precursor, an additive may be introduced into a material processing system at one or more locations where the parylene precursor is in a vaporized state (e.g., in a vaporization chamber or at an entry side of a pyrolysis tube), at one or more locations where reactive species have been formed from the parylene precursor (e.g., in the pyrolysis tube or at a location just downstream from the pyrolysis tube) and/or at one or more locations into a deposition chamber of the material processing system.

The additive(s) may be in an atomized form, a vaporized form or comprise reactive species once it (they) has (have) been introduced into the material processing system. Since the additive(s) is (are) such a state, they may diffuse throughout or otherwise be mixed with the material (e.g., reactive species) that will ultimately form a protective coating on one or more substrates. Additionally, the presence of additive(s) in the material from which the protective coating will ultimately be formed may enable the additive(s) to be incorporated into the protective coating as the protective coating is formed on (e.g., deposited onto or polymerized on) one or more substrates.

In specific embodiments where a protective coating is formed from a parylene precursor and, thus, the protective coating comprises a parylene, reactive species (i.e., unsubstituted or substituted p-xylylene monomers) and additive(s) may be drawn through a deposition chamber of a material processing system and onto surfaces of one or more substrates within the deposition chamber. With the additive(s) dispersed through the reactive species, the additive(s) and the reactive species may be brought into contact with the surfaces of the one or more substrates simultaneously or substantially simultaneously (i.e., the additive(s) may come into contact with the substrate or a protective coating being formed while polymerization occurs or between polymerization cycles). Thus, as the reactive species on the substrate (s) react with one another, or covalently bond to each other or polymerize, the additive(s) may be incorporated into the protective coating that is formed on the substrate(s) and, in some embodiments, the additive(s) may be dispersed throughout the protective coating. As the reactive species deposit onto the substrates, they covalently bond to one another, or polymerize.

The additive(s) may be substantially homogeneously dispersed throughout the protective coating or even homogeneously dispersed throughout the protective coating. Alternatively, one or more additives may be dispersed in a gradient throughout the protective coating (e.g., the additive (s) may be more concentrated at one surface of the protective coating than at a central location within a thickness of the protective coating and/or at an opposite surface of the protective coating).

Substrates that carry protective coatings to which one or more additives have been added are also within the scope of this disclosure. Such a substrate may include, but is not limited to, a subassembly of an electronic device, an electronic device, or the like.

Methods that relate to the utility of protective coatings into which one or more additives have been incorporated are also within the scope of this disclosure. Without limitation, methods for inspecting a protective coating that includes a contrasting additive are disclosed. Such a method may include viewing (e.g., by human visual perception or with an automated machine vision system) a substrate to determine whether or not a protective coating has been applied to the substrate. In a similar method, the presence of one or more contrasting additives in a protective coating may enable visual inspection of one or more aspects of the quality of the protective coating (e.g., its confluence or its thickness). In yet another embodiment of a method, a contrasting additive may facilitate or even enable the inspection of the periphery of a protective coating to ensure that the protective coating has been properly applied to a substrate.

Other aspects, as well as features and advantages of various aspects, of the disclosed subject matter will become apparent to those of ordinary skill in the art through consideration of the ensuing description, the accompanying drawings and the appended claims.

DETAILED DESCRIPTION

Figures 1, 2:
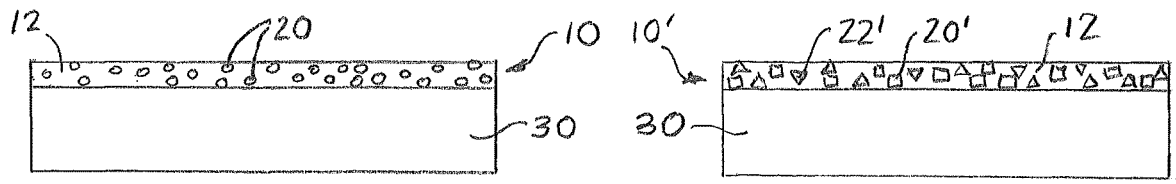
FIG. 1 schematically depicts an embodiment of a protective coating on a substrate, the protective coating including a protective material and at least one additive dispersed throughout the protective material.
FIG. 2 schematically shows an embodiment of a protective coating on a substrate, the protective coating including a protective material with a plurality of different additives dispersed throughout the protective material.

With reference to FIGS. 1 and 2, a protective coating 10, 10' according to this disclosure includes a protective material 12 with one or more additives 20, 20', 22', etc., dispersed therethrough or incorporated therein. More specifically, FIG. 1 shows an embodiment of a protective coating 10 with an additive 20 dispersed through the protective material 12, while FIG. 2 illustrates an embodiment of protective coating 10' with two or more different additives 20', 22', etc., dispersed through the protective material 12 or incorporated therein.

In various embodiments, the protective material 12 of the protective coating 10, 10' comprises a polymer that is impermeable to moisture or substantially impermeable to moisture and, thus, provide moisture resistance.

A moisture resistant coating is impermeable to, substantially impermeable to and/or repel water, an aqueous solution (e.g., salt solutions, acidic solutions, basic solutions or beverages) or vapors of water or other aqueous materials (e.g., humidity, fogs, or mists) or wetness). Use of the term "moisture resistant" to modify the term "coating" should not be considered to limit the scope of materials from which the coating protects one or more components of an electronic device. The terms "moisture resistant" and "moisture resistance" may also refer to the ability of a coating to restrict permeation of or repel organic liquids or vapors (e.g., organic solvents or other organic materials in liquid or vapor form), as well as a variety of other substances or conditions that might pose a threat, for example, of damage or degradiation, to a substrate 30 (e.g., a moisture sensitive substrate), such as an electronic device or its components.

Examples of protective materials 12 that are moisture resistant include, but are not limited to, unsubstituted and/or substituted poly(p-xylylene) polymers, which are also referred to in the art as "parylenes." In some embodiments, the protective material of a protective coating 10, 10' may comprise parylene C, in which each repeat unit, or -mer, includes a single substitution of carbon for hydrogen on its aromatic ring. In other embodiments, parylene AF-4, in which alpha hydrogen atoms (i.e., those on carbon atoms that are not part of the aromatic ring) are replaced with fluorine. Of course, other types of parylene may be used as a protective material 12 of a protective coating 10, 10' according to this disclosure, as may other types of polymers and other materials.

In embodiments where an additive 20, 20', 22', etc., of a protective coating 10, 10' according to this disclosure is a contrasting additive, the additive 20, 20', 22', etc., may comprise a colorant. The use of a colorant as an additive 20, 20', 22', etc., may impart a protective film 10, 10' with a desired color, and may render the protective coating 10, 10' readily visible to an individual and/or to automated viewing equipment (e.g., a machine vision system). Some non-limiting examples of colorants include dyes, pigments, metallic colorants, and the like.

Some non-limiting examples of colorants that may be incorporated into a protective film include dyes, such as anthraquinone dyes, aryl-methane dyes (which have vivid colors), azo dyes (which have vivid colors), coumarin dyes, cyanine dyes, nitro dyes, nitroso dyes, phthalocyanine dyes (which are intensely blue-green colored), azin dyes, eurhodin dyes, safranin dyes, xanthene dyes, indophenol dyes (which are deep blue in color), oxazin dyes, oxazone dyes, thiazin dyes, thiazole dyes, fluorine dyes, flurone dyes (i.e., rhodamine dyes) and pyronin dyes, among others. Other non-limiting examples of colorants that may be incorporated into a protective film include pigments, such as Alizarine, Carbon Black, Carmine, Indian Yellow, Indigo and others. Metallic colorants may include, but are not limited to: aluminum (Al), copper (Cu), steel, silver (Ag), gold (Au) and other metals. A metallic colorant may affect the appearance of a protective film into which it is incorporated.

Metallic colorants may also accelerate the transfer of heat through a precursor material as the precursor material is processed.

Figure 3:
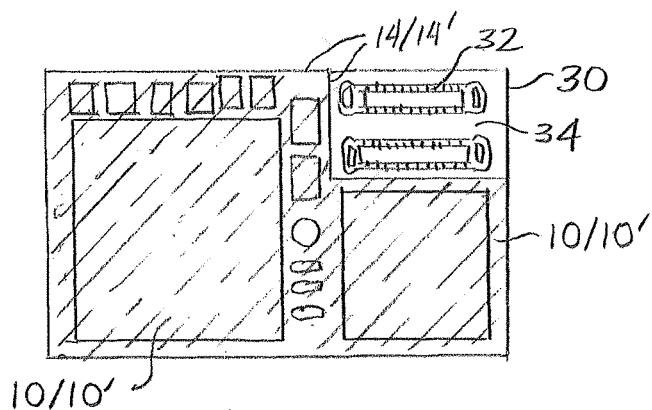
FIG. 3 schematically illustrates an embodiment of a substrate to which a protective coating has been applied, the protective coating comprising a contrasting additive that renders the protective coating visibly discernible from the substrate.

A colorant, when used as a contrasting additive 20, 20', 22', etc., and incorporated into a protective material 12 of a protective coating 10, 10', may render the protective coating 10, 10' visibly distinctive from the substrate 30 by which the protective coating 10, 10' is carried, or visibly distinctive from one or more components or features 32, 34 of the substrate 30, as illustrated by FIG. 3.

With continued reference to FIGS. 1-3, the visual distinctiveness of a protective coating 10, 10' that includes an additive 20, 20', 22', etc., that provides visible contrast may facilitate inspection of a protective coating 10, 10' and/or inspection of a substrate 30 to which a protective coating 10, 10' has been applied. Inspection of a protective coating 10, 10' and/or a substrate 30 may be effected by an individual (i.e., by eye). As an alternative, or in addition to individual visual inspection, automated equipment (e.g., a machine vision system) may be used to inspect a protective coating 10, 10' and/or a substrate 30.

Such inspection may merely consist of determining whether or not a protective coating 10, 10' has been applied to the substrate 30. In further embodiments, such inspection may enable confirmation that a protective coating 10, 10' covers intended portions of a substrate 30 (e.g., after the protective coating 10, 10' has been deposited onto the substrate 30 or after portions of the protective coating 10, 10' have been selectively removed from the substrate 30). Even further, a contrasting additive 20, 20', 22', etc., of a protective coating 10, 10' may enable inspection of the peripheral edges 14, 14' of the protective coating to enable a determination as to whether or not selective removal processes have damaged the protective coating 10, 10', pulled the protective coating 10, 10' away from the substrate 30 or otherwise increased the likelihood that the protective coating 10, 10' will fail when exposed to moisture or other conditions.

Contrasting additives 20, 20', 22', etc., of a protective coating 10, 10' may enable inspections that provide information about a protective coating 10, 10'. Without limitation, visual inspection of a protective coating 10, 10' that includes one or more contrasting additives 20, 20', 22', etc., may enable a determination as to the confluence of a protective coating 10, 10' (i.e., whether or not there are any holes or voids in the protective coating 10, 10'). As another option, the presence of contrasting additives 20, 20', 22', etc., in a protective coating 10, 10' may provide information about thicknesses of the protective coating 10, 10' at different locations (e.g., by virtue of the intensity or darkness of the color of the protective coating 10, 10' when visualized at those locations).

In some embodiments, at least one additive 20, 20', 22', etc., that has been incorporated into a protective material 12 of a protective coating 10, 10' may comprise a fluorescent material, such as a fluorescent dye. As those of ordinary skill in the art will appreciate, fluorescent materials emit characteristic electromagnetic radiation (e.g., a specific wavelength of ultraviolet light, visible light or infrared light) when excited by a specific excitation wavelength or bandwidth of electromagnetic radiation. Some non-limiting examples of fluorescent materials that may be incorporated as additives 20, 20', 22', etc., into a protective coating 10, 10' include 2,2'-(2,5-thiophenediyl)bis(5-tert-butylbenzoxazole), acridine dyes, benzoxazole dyes (e.g., fluorescent brightener 184), coumarin dyes, cyanine dyes, diazonium dyes, xanthene dyes and rhodamine dyes.

An additive 20, 20', 22', etc., of a protective coating 10, 10' according to this disclosure may enhance a property or characteristic of the protective coating 10, 10'. Without limitation, at least one additive 20, 20', 22', etc., of a protective coating 10, 10' may comprise a UV stabilizer, such as a UV absorber, a UV quencher and/or a hindered amine light stabilizer (HALS). Some non-limiting examples of UV absorbers include carbon black, rutile titanium oxide, benzophenones, hydroxybenzophenone, benzotriazoles, hydroxyphenylbenzotriazole, triazines, hydroxyphenyltriazines and oxanilides. UV quenchers quench the excited state of a carbonyl group formed during the photo-oxidation of a protective material 12, returning the carbonyl group to a ground state. Nickel quenchers are an example of a group of suitable UV quenchers. HALS, which include a 2,2,6,6-tetramethylpiperidine ring structure, limit photodegradation of the protective material 12 by trapping free radicals that form during photo-oxidation of a protective material 12. More specifically, through a process called the Denisov Cycle, HALS absorb UV radiation and form nitroxyl radicals. The inclusion of a UV stabilizer in a protective coating 10, 10' according to this disclosure may enhance an ability of the protective material 12 of the coating 10, 10' to withstand exposure to UV radiation, which may increase the longevity of the protective coating 10, 10'.

As another example, an additive 20, 20', 22', etc., (such as, but not limited to, a UV stabilizer) may increase an opacity of the protective coating 10, 10' to one or more types of electromagnetic radiation (e.g., UV radiation or X-ray radiation). By increasing the opacity of a protective coating 10, 10' over and above an opacity of the protective material 12 from which the protective coating 10, 10' is formed, the protective coating 10, 10' or, more specifically, the additive 20, 20', 22', etc., may attenuate one or more wavelengths or bandwidths of electromagnetic radiation. The ability of a protective coating 10, 10' to attenuate one or more wavelengths or bandwidths of electromagnetic radiation may protect a substrate 30 from potentially damaging radiation, provide a degree of security (e.g., by concealing one or more features or components of the substrate 30) or provide other advantages.

Of course, enhancing additives 20, 20', 22', etc., that alter other properties or characteristics of a protective coating 10, 10' (e.g., its ability to transmit heat, its dielectric properties, its water repellence characteristics or its hardness) may also be incorporated into a protective coating 10, 10'.

Figure 4:
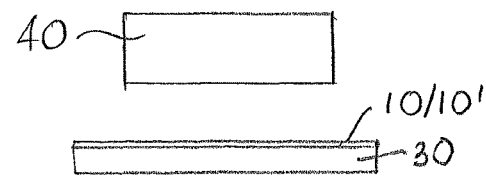
FIG. 4 schematically depicts inspection of a protective coating that has been applied to a substrate in accordance with various embodiments of the disclosed subject matter and/or of the substrate to which the protective coating has been applied.

As illustrated by FIG. 4, the incorporation of one or more additives 20, 20', 22', etc. (FIGS. 1 and 2), into a protective material 12 to provide a protective coating 10, 10' according to this disclosure may enable inspection of the protective coating 10, 10'. As illustrated, a protective coating 10, 10' and/or a substrate 30 to which the protective coating 10, 10' has been applied may be visualized by a viewer 40. The viewer may comprise a human eye (or a pair of human eyes) and/or an automated machine vision system. Such a method may enable a determination of whether or not a protective coating 10, 10' has been applied to the substrate 30. In a similar method, the presence of one or more contrasting additives 20, 20', 22', etc., in a protective coating 10, 10' may enable visual inspection of one or more aspects of the quality of the protective coating 10, 10' (e.g., its confluence or its thickness). In yet another embodiment of a method, a contrasting additive 20, 20', 22', etc., may facilitate or even enable the inspection of the periphery of a protective coating 10, 10' to ensure that the protective coating 10, 10' has been properly applied to a substrate 30.

An additive 20, 20', 22', etc., may impart a protective coating 10, 10' with a signature that facilitates identification of a source of the protective coating 10, 10'. As an example, a provider or a precursor material may have a specific additive 20, 20', 22', etc. (or a plurality of specific additives 20, 20', 22', etc.) incorporated into the precursor material to enable subsequent confirmation that the provider is the actual source of the precursor material from which a particular protective coating 10, 10' is formed. As another example, an applicator of protective coatings 10, 10' may use an additive to enable subsequent confirmation that the applicator was the party that applied a particular protective coating 10, 10'. Thus, one or more additives 20, 20', 22', etc., may be used in a protective coating 10, 10' to provide some control over the quality of the precursor materials and/or the processes that are used to for a protective coating 10, 10'.

In yet another example of the utility of contrasting additives 20, 20', 22', etc., in a protective coating 10, 10', distinct additives 20, 20', 22', etc., may be incorporated into different protective coatings 10, 10' to provide information about the process(es) used to form a particular protective coating 10, 10', characteristics of the protective coating 10, 10' (e.g., the type of protective material 12 used, an average thickness of the protective coating 10, 10', etc.) and the like. As such, different additives 20, 20', 22', etc., may correspond to different processes, different combinations of processes, different protective coating 10, 10' characteristics and/or different combinations of protective coating 10, 10' characteristics.

Figure 5:
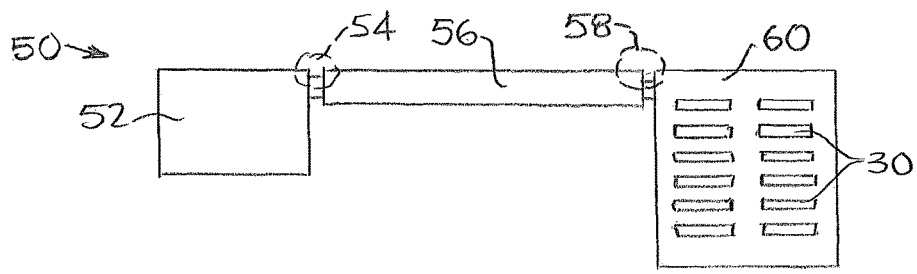
FIG. 5 provides a schematic representation of a material processing system, showing various locations at which an additive may be incorporated into material that will ultimately result in the formation of a protective coating on one or more substrates in accordance with various embodiments of the disclosed subject matter.

Turning now to FIG. 5, an embodiment of a material processing system 50 for applying a protective coating 10, 10' (FIGS. 1 and 2) to one or more substrates 30 (FIGS. 1 and 2) is depicted. The material processing system 50 of FIG. 5 includes a vaporization chamber 52, a pyrolysis tube 56 and a deposition chamber 60. Such a material processing system 50 may be used to deposit a protective coating 10, 10' that comprises parylene (as the protective material 12 (FIGS. 1 and 2) onto one or more substrates 30. Some non-limiting examples of material processing systems 50 are disclosed by U.S. Patent Application Publication 2011/0262740 of Martin, et al. and U.S. Patent Application Publication 2013/0251889 of Cox et al., the disclosures of both of which are hereby incorporated by reference.

Where the material processing system 50 processes a precursor material that comprises a parylene precursor (e.g., a parylene dimer) to deposit a parylene onto one or more substrates 30, the vaporization chamber 52 of the material processing system 50 may be configured to vaporize (e.g., evaporate or sublimate) the precursor material to facilitate its introduction into the pyrolysis tube 56. The pyrolysis tube 56 of the material processing system 50 may be heated to a temperature that will crack the precursor material into reactive species (e.g., parylene monomers). The reactive species may be drawn from the pyrolysis tube 56 into the deposition chamber 60 of the material processing system 50, and onto one or more substrates 30 that have been positioned within the deposition chamber 60. As the reactive species enter into the deposition chamber 60, they contact, or are deposited onto, surfaces within the deposition chamber 60, including exposed surfaces of each substrate 30 within the deposition chamber 60. As the reactive species contact these surfaces, they react with one another, or polymerize, to form a protective coating.

The foregoing process may be modified by introducing one or more additives 20, 20', 22', etc., into the precursor material and/or the reactive species, as is explained in further detail hereinafter.

In some embodiments, one or more additives 20, 20', 22', etc. (FIGS. 1 and 2) may be introduced into a precursor to a protective material 12 (FIGS. 1 and 2) at the vaporization chamber 52 of the material processing system 50. In some embodiments, the one or more additives 20, 20', 22', etc., may be introduced into the vaporization chamber 52 with the precursor material. Even more specifically, the precursor material and the one or more additives 20, 20', 22', etc., may be mixed together or introduced into the vaporization chamber 52 in separate quantities. In any event, the precursor material and the one or more additives may be vaporized (e.g., evaporated or sublimated) at the same time (i.e., concurrently or simultaneously). Alternatively, the precursor to the protective material 12 and the additive(s) 20, 20', 22', etc., may be vaporized sequentially. As a non-limiting example, the precursor may be vaporized, then the additive(s) 20, 20', 22', etc., may be vaporized. If desired, one or both of vaporization of the precursor and the additives 20, 20', 22', etc., may be repeated at least once.

As an alternative to introducing one or more additives 20, 20', 22', etc., into the vaporization chamber 52, the one or more additives 20, 20', 22', etc., may be introduced into vaporized precursor material at a location downstream from the vaporization chamber 52; for example, at location 54 of the material processing system 50. In such an embodiment, the one or more additives 20, 20', 22', etc., may be sprayed, atomized or vaporized before or during their introduction into the precursor material.

As another option, introduction of the one or more additives 20, 20', 22', etc., may occur at the pyrolysis tube 56. Thus, the one or more additives 20, 20', 22', etc., may be introduced into vaporized precursor material and/or reactive species (e.g., parylene monomers) that are formed by pyrolysis of the precursor material. When introduced into the pyrolysis tube 56, the one or more additives 20, 20', 22', etc., may be sprayed, atomized or vaporized.

As yet another option, the one or more additives 20, 20', 22', etc., may be introduced into reactive species as the exit the pyrolysis tube 56; i.e., at location 58 of the material processing system 50. The one or more additives 20, 20', 22', etc., may be sprayed, atomized or vaporized before they are introduced into the material processing system 50 at location 58 or while they are introduced into the material processing system 50 at location 58.

Of course, if one or more additives 20, 20', 22', etc., are introduced into the precursor material and/or into reactive species that have been formed from the precursor material, the additive(s) 20, 20', 22', etc., should be able to withstand, or resist degradation by, the conditions to which the additive(s) 20, 20', 22', etc., will be subjected. As an example, an additive 20, 20', 22', etc. (or a plurality of additives) that is (are) introduced into the material processing system 50 upstream from the pyrolysis tube 56, at a location along a length of the pyrolysis tube 56 or just downstream from the pyrolysis tube 56 (e.g., at location 58) should be able to withstand the typically high temperatures that are present within the pyrolysis tube 56 during operation of the material processing system 50.

One or more additives 20, 20', 22', etc., may also be introduced into the deposition chamber 60 of the material processing system 50 as reactive species enter into the deposition chamber 60. When the additive(s) 20, 20', 22', etc., is (are) introduced into the deposition chamber 60, it may be in an atomized form or in a vaporized state.

With the reactive species and one or more additives 20, 20', 22', etc., mixed together in the deposition chamber 60 of a material processing system 50, and one or more substrates 30 present within the deposition chamber 60, the one or more additives 20, 20', 22', etc., may be incorporated into the protective material 12 (FIGS. 1 and 2). More specifically, as the protective material 12 is (or the reactive species from which the protective material 12 is formed are) deposited onto a substrate 30, the additive(s) 20, 20', 22', etc., may also be deposited onto the substrate 30. By way of such co-deposition, the additive(s) 20, 20', 22', etc., may be dispersed throughout the protective material 12 as a protective coating 10, 10' is formed on the substrate 30.

Without limiting the scope of the disclosed subject matter, the substrate(s) 30 may comprise portable electronic devices, wearable electronic devices, electronic devices that are used in medical procedures, including implantable electronic devices, vehicular electronic devices, other electronic devices that may be exposed to moisture and/or the elements, non-electronic medical devices, or any other suitable substrate that may benefit from the application of a protective coating 10, 10'.

Example

In a specific example, 2,2'-(2,5-thiophenediyl)bis(5-tert-butylbenzoxazole) (available from Mayzo, Inc., of Suwanee, Ga. as BENETEX® OB), a dye, was mixed with dichloro [2.2]paracyclophane (i.e., Parylene C), a precursor material, in a variety of dye:precursor material ratios, ranging from 0.01 weight percent to 5.0 weight percent.

The mixtures of dye and precursor material were introduced into a vaporization chamber 52 of a chemical vapor deposition (CVD) apparatus—a type of material processing system 50. While within the vaporization chamber 52, the mixtures were heated to vaporization temperatures of 150° C. to 250° C., and then drawn into a pyrolysis tube 56 of the CVD apparatus.

While in the pyrolysis tube 56, the precursor material and the dye were subjected to a temperature sufficient to create reactive species from the precursor material. Specifically, but without limitation, the precursor material and the dye were pyrolyzed at a temperature of about 600° C. (e.g., at a temperature of about 550° C. to about 650° C.).

Reactive species and dye were drawn from the pyrolysis tube 56 into a deposition chamber 60 of the CVD apparatus. The deposition chamber 60 contained substrates 30, including both glass coupons and printed circuit boards (PCBs). The dye was incorporated into the parylene films that were deposited onto the substrates 30.

For comparison purposes, similar substrates (i.e., glass coupons and PCBs) were coated with protective film of Parylene C under standard processes (i.e., processes in which no dye was incorporated into the Parylene C).

The coated substrates were then exposed to ultraviolet (UV) light. The glass coupons and PCBs that were coated with Parylene C into which the BENETEX® OB fluorescent dye had been incorporated fluoresced when exposed to UV light, while the Parylene C films that lacked the dye did not fluoresce.

By incorporating a fluorescent dye or any other contrasting additive 20, 20', 22', etc. (FIGS. 1 and 2), into a protective coating 10, 10' (FIGS. 1 and 2) that has been coated onto an electronic device, a component of an electronic device or any other substrate 30, the presence of the protective coating 10, 10', as well as its integrity, may be readily detected using various inspection procedures.

Of course, a coating or film that has been formed in accordance with this disclosure need not be used as a protective coating; the coating or film may serve any other suitable purpose (e.g., it may comprise an electrically insulative layer or it may be used for decorative purposes).

Although the preceding disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A method for depositing a protective film into which an additive is incorporated onto a substrate, comprising:
   introducing a precursor material and a first additive in separate quantities into a vaporization chamber and vaporizing the precursor material and the first additive sequentially;
   concurrently introducing the vaporized precursor material and the vaporized first additive into a pyrolysis tube of a chemical vapor deposition apparatus by vaporizing a mixture of the precursor material and the first additive, wherein the first additive is an enhancing additive and a UV stabilizer that attenuates ultraviolet radiation, wherein concurrently introducing comprises introducing an unsubstituted parylene dimer or a substituted parylene dimer into the pyrolysis tube along with the vaporized first additive;
   subjecting the vaporized precursor material and the vaporized first additive to pyrolysis conditions to create reactive species from the vaporized precursor material;
   drawing the reactive species and the first additive or species of the first additive into a deposition chamber of the chemical vapor deposition apparatus;
   introducing an atomized second additive into the reactive species at a location downstream from the pyrolysis tube and prior to the deposition chamber, wherein the second additive is homogeneously dispersed throughout the reactive species, wherein the second additive is a contrasting additive;
   enabling the reactive species and the first additive or species of the first additive and the second additive to deposit onto at least one substrate within the deposition chamber, with the reactive species polymerizing to form the protective film on the substrate and the first and second additive being incorporated into the protective film, wherein a feature of the at least one substrate is exposed laterally beyond a periphery of the protective film, wherein a color of the second additive differs in color from the feature; and
   determining a thickness of the protective film based on an intensity of a color of the second additive in the protective coating.

2. The method of claim 1, further comprising:
   introducing a third additive, wherein introducing the third additive comprises atomizing to introduce the third additive into the deposition chamber, wherein the third additive is an enhancing additive different from the first additive; and
   enabling the reactive species and the first additive or species of the first additive and the second additive and the third additive to deposit onto at least one substrate within the deposition chamber, with the reactive species polymerizing to form the protective film on the substrate and the first and second additive being incorporated into the protective film.

3. The method of claim 1, wherein the second additive is a phosphorescent material.

4. The method of claim 1, wherein the second additive is configured to accelerate a transfer of heat through the precursor material during processing.

5. The method of claim 1, further comprising covalently bonding the reactive species to one another while the second additive is dispersed throughout the reactive species.

6. The method of claim 1, determining a confluence of the protective coating based on a contrast of the color of the second additive and a color of the substrate.

7. The method of claim 1, wherein subjecting comprises subjecting the precursor material and the first additive to a temperature of about 550° C. to about 650° C.

8. The method of claim 1, wherein concurrently introducing the precursor material to the protective film and the first additive into the pyrolysis tube of the chemical vapor deposition apparatus comprises introducing a precursor to a poly(p-xylylene) into the pyrolysis tube.

9. The method of claim 8, wherein enabling the reactive species and the first additive or the species of the first additive and the second additive to deposit onto at least one substrate comprises dispersing the second additive in a gradient through the poly(p-xylylene), and wherein the first additive is not dispersed in a gradient through the protective film.

10. The method of claim 2, wherein the second additive is a metallic colorant configured to accelerate the transfer of heat through the precursor material during processing.

* * * * *